United States Patent Office 3,342,827
1-LOWER ALKYL-3-(p-HALOBENZOYL)-4-(p-HALO-PHENYL)-4-(LOWER ACYLOXY)PIPERIDINE
Marshall D. Draper, Woodland Hills, and Fred Keller, Northridge, Calif., assignors to Rexall Drug and Chemical Company, Los Angeles, Calif., a corporation of Delaware
No Drawing. Filed June 11, 1964, Ser. No. 374,284
2 Claims. (Cl. 260—294.3)

This invention relates to compositions of matter classified in the art of chemistry as substituted piperidines.

The invention sought to be patented resides in the concept of 1-lower alkyl-3-(p-halobenzoyl)-4-(p-halophenyl)-4-(lower acyloxy)piperidines and to their hereinafter disclosed equivalents.

As used throughout the specification and in the claims the term "lower alkyl" embraces both straight and branches chain alkyl radicals having from 1 to 6 carbon atoms, the term "halo" embraces chloro, bromo, fluoro and iodo, and the term "lower acyloxy" embraces straight and branched groups of the formula

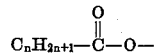

wherein $n$ is 1 to 5 such as acetoxy, propionoxy, isopropionoxy, butyroxy and the like.

The tangible embodiments of this invention possess the inherent general physical properties of being solid crystalline materials. Infra-red spectral data and elemental analysis, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity as antipyretic, anticholinergic and central nervous system depressant agents as determined by recognized and accepted pharmacological test procedures.

The manner and process of making and using the invention will now be generally described so as to enable a person skilled in the art of chemistry to make and use the same as follows:

The compounds comprising the tangible embodiments of this invention are prepared from appropriately substituted diketone amines according to the following reaction.

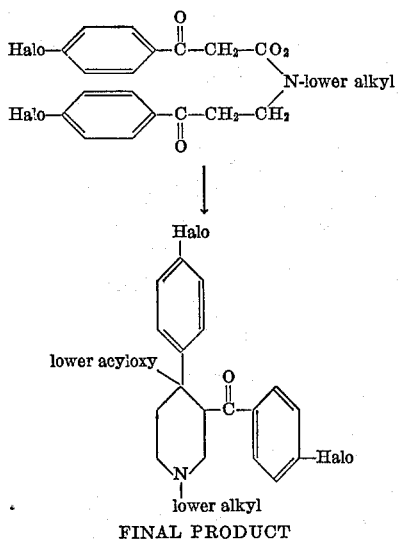

FINAL PRODUCT

The substituted diketone amine starting materials employed in the preparation of the tangible embodiments of this invention are known compounds that may easily be prepared according to the method described by Mannich and Heilner (Ber., 55: 356, 1922) as improved by Plati et al, (J. Org. Chem., 14: 543–549, 1949).

In obtaining the compounds of the present invention, the appropriately substituted diketone amine starting material is subjected to treatment with base followed by treatment, at room temperature, with a lower alkyl carboxylic acid anhydride, for example acetic anhydride, propionic anhydride, isopropionic anhydride, butyric anhydride and the like in the presence of a small quantity of sulfuric acid as catalyst. The product is then recovered by conventional techniques of crystallization.

Starting materials having halo substituents at positions other than the para-positions of the benezene rings are prepared by the same techniques as set forth in the Mannich et al. and Plati et al. papers referred to above and are the full equivalents to the specific starting materials depicted above. Their use in the above described reaction sequence results in the preparation of final products having halo substitution at the same place on the benzene rings as in the starting materials, such products having the same utility as the 1-lower alkyl-3-(p-halobenzoyl)-4-(p-halophenyl)-4-(lower acyloxy)piperidines depicted in the above reaction sequence.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate, maleate, fumarate and picrate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:

*4-acetoxy-3-(p-chlorobenzoyl)-4-(p-chlorophenyl)-1-methylpiperidine*

Bis-N-(β-p-chlorobenzoylethyl)-methyl amine hydrochloride (130 g., 0.325 mole) is dissolved in boiling water (1300 ml.) and is heated, with stirring, on a steam bath for 60 minutes. A 10% solution of sodium hydroxide (500 ml.) is then added with stirring. A solid forms during the addition which, after cooling of the mixture to room temperature, is recovered by filtration, washed twice with water and air dried.

A portion of the solid (36.4 g.) is suspended in anhydrous ether (200 ml.) and an equivalent of sulfuric acid (2.7 ml. conc. acid, sp. gr. 1.85) in anhydrous ether is added. The mixture is taken to dryness in vacuo to give a solid residue. This residue is taken up in acetic anhydride (200 ml.) and the solution is allowed to stand for one hour at room temperature after which the solution is taken down in vacuo. Water (about 100 ml.) and a large excess of ammonium hydroxide is added and the mixture then extracted with ether several times. The ether extracts are washed with water and dried over anhydrous magnesium sulfate and filtered. The product is recovered by crystallization from ether/petroleum ether in the form of white crystals, M.P. 145.5° C.– 147° C.

*Analysis.*—Calculated for $C_{21}H_{21}O_3NCl_2$: C, 62.08%; H, 5.21%; N, 3.45%; Cl, 17.45%. Found: C, 62.64%; H, 5.66%; N, 3.30%; Cl, 17.40%.

The subject matter which the applicants regard as their invention is particularly pointed out and distinctly claimed as follows:

1. 1-lower alkyl-3-(p-halobenzoyl)-4-(p-halophenyl)-4-(lower acyloxy)piperidine.

2. 4-acetoxy-3-(p-chlorobenzoyl)-4-(p-chlorophenyl)-1-methylpiperidine.

References Cited

UNITED STATES PATENTS

| | | | |
|---|---|---|---|
| 2,489,669 | 11/1949 | Plati et al. | 260—294.7 |
| 2,546,652 | 3/1951 | Plati et al. | 260—290 |
| 2,807,585 | 9/1957 | Gardner et al. | 260—294.7 |

WALTER A. MODANCE, *Primary Examiner.*

AVROM D. SPEVACK, *Assistant Examiner.*